United States Patent
Dulac et al.

(10) Patent No.: US 7,328,139 B2
(45) Date of Patent: Feb. 5, 2008

(54) DEVICE AND SOFTWARE PACKAGE FOR EXTRACTING A GEOLOGICAL HORIZON AND RELATED PROPERTIES

(75) Inventors: Jean-Claude Dulac, Sugarland, TX (US); Fabien Bosquet, Nancy (FR); Emmanuel Labrunye, Nancy (FR)

(73) Assignee: Earth Decision Sciences, Vandoeuvre-les-Nancy (FR)

( * ) Notice: Subject to any disclaimer, the term of this patent is extended or adjusted under 35 U.S.C. 154(b) by 207 days.

(21) Appl. No.: 10/518,484

(22) PCT Filed: Jun. 11, 2003

(86) PCT No.: PCT/FR03/01753

§ 371 (c)(1),
(2), (4) Date: Aug. 8, 2005

(87) PCT Pub. No.: WO04/001450

PCT Pub. Date: Dec. 31, 2003

(65) Prior Publication Data

US 2006/0129359 A1 Jun. 15, 2006

(30) Foreign Application Priority Data

Jun. 19, 2002 (FR) .................................. 02 07596

(51) Int. Cl.
*G06F 17/50* (2006.01)
*G01V 1/28* (2006.01)

(52) U.S. Cl. ............... 703/2; 703/9; 702/2; 702/14; 702/16; 367/72; 367/73

(58) Field of Classification Search ............... 703/1–2, 703/10, 9; 702/2, 14, 16; 367/72, 73
See application file for complete search history.

(56) References Cited

U.S. PATENT DOCUMENTS

| 3,731,269 | A | * | 5/1973 | Judson et al. ................. 367/54 |
| 4,672,546 | A | | 6/1987 | Flinchbaugh |
| 5,615,171 | A | * | 3/1997 | Hildebrand .................. 367/72 |
| 5,930,730 | A | | 7/1999 | Kirlin et al. |
| 6,138,075 | A | * | 10/2000 | Yost ............................. 702/14 |
| 6,138,076 | A | | 10/2000 | Graf et al. |
| 6,151,555 | A | | 11/2000 | Pepper et al. |
| 6,665,615 | B2 | * | 12/2003 | Van Riel et al. ................ 702/2 |
| 2002/0022930 | A1 | | 2/2002 | Dalley et al. |
| 2004/0204859 | A1 | * | 10/2004 | Knobloch .................... 702/16 |

* cited by examiner

*Primary Examiner*—Thai Phan
(74) *Attorney, Agent, or Firm*—Pearl Cohen Zedek Latzer, LLP

(57) ABSTRACT

The invention concerns a method for extracting a geological horizon and related properties of a seismic representation, comprising a step (100) which consists in digital modeling with continuous local seismic traces, calculating the optimal offset and defining a conditional neighbourhood of a reference central continuous local seismic trace; a step (101) which consists in defining a two-dimensional matrix whereof the line and column indices correspond to the coordinates of the geophones; a third step (102) which consists in selecting a seed point; a fourth step (103) which consists in determining the point vertically closest to the seed point and a fifth step (104) which consists in assigning to the point P(p,q,t) the value P(p,q,t+hij,pq,k), where hij, pq,k is optimal offset of the neighbouring point P(i,j,k), so as to estimate the related properties of the conditional neighbourhood thereby filling the two-dimensional extraction matrix of step (101).

18 Claims, 4 Drawing Sheets

DEVICE AND SOFTWARE PACKAGE FOR EXTRACTING A GEOLOGICAL HORIZON AND RELATED PROPERTIES

BACKGROUND OF THE INVENTION

The invention relates to a process to extract a geological horizon and related properties from their image deduced from seismic data.

The invention also relates to a device to extract a geological horizon and associated properties from their image deduced from seismic data.

The invention finally relates to computer software to extract a geological horizon and related properties from their image deduced from seismic data.

DESCRIPTION OF THE RELATED ART

There are known processes for extracting the horizon and their seismic attributes. In these known processes, there is constructed a three-dimensional seismic attribution matrix of the same size and same sampling as the initial three-dimensional seismic matrix.

To attribute to each point on the horizon a value of seismic attribution, one can either interpolate the surrounding modes of the three-dimensional seismic attribution matrix or select the stored value in the mode which is closest to the three-dimensional seismic attribution matrix.

In the case of interpolation, the corresponding preprocessing requires a large processing time and a very great quantity of available memory; this is why it is generally necessary to carry out this pretreatment on a powerful computer.

In the case of the choice of attribution of the nearest node, this pretreatment is not necessary, and the determination of the attribution can only be carried out at points adjacent the points of the network of the original three-dimensional seismic matrix.

The principal drawback of the prior art is to introduce the defects or artifacts which induce critical errors on the horizon and the seismic attributes and lead to poor geological interpretation of the seismic measurements.

SUMMARY OF THE INVENTION

The first object of the invention is to improve the known technique by providing a direct and more exact computation, by minimizing the risk of possible error on the attributes at all points on the horizon.

A second object of the invention is to suppress the vertical errors that are adapted to lead to a poor geological interpretation.

The invention has for its object a process to extract a geological horizon and associated properties from a seismic representation, in which there is constructed a continuous function $S_{ij,k}(t)$ by interpolation or approximation of the discrete seismic traces of a multidimensional seismic matrix, said function being designated as a "continuous local seismic trace", comprising the following steps:

a). using as optimum offset of two adjacent continuous local seismic traces, the value of the offset rendering a maximum their correlation function;

b). taking as conditional neighborhood of a continuous "central" local seismic trace $S_{ij,k}(t)$ the sub-neighborhood consisting in adjacent traces $S_{pq,k}(t)$ corresponding to optimum offsets associated with correlations $R_{ij,pq,k}(h)$ greater than a predetermined threshold comprised between 0 and 1;

c). constructing a two-dimensional extraction matrix adapted to be filled with extracted values;

d). choosing a seed point $P(i,j,t)$ and determining the point $P(i,j,k)$ that is vertically closest;

e). estimating the related properties of the conditional neighborhood and filling the two-dimensional extraction matrix with offset properties by translation of the current variable (t) of the optimum offset value ($h_{ij,pq,k}$) corresponding to the point $P(i,j,k)$ vertically nearest.

According to other characteristics of the invention:

the content of the two-dimensional matrix of step c) is successively replaced in the course of successive repetitions of extraction, at each repetition, there is utilized as new seed points of step d) all the points corresponding to locations of the two-dimensional matrix of step c) filled with the preceding repetition, the property of extracted subsurface is the seismic amplitude reflected and detected by geophones, there is visualized on a visualization screen horizon surfaces painted with colors corresponding to a code of the extracted properties.

The invention also relates to a device for practicing the process according to the invention, comprising means to use as optimum offset of two adjacent continuous local seismic traces, the value of the offset rendering a maximum their correlation function, means to take as conditional neighborhood of a central continuous local seismic trace $S_{ij,k}(t)$ the sub-neighborhood consisting in adjacent traces $S_{pq,k}(t)$ corresponding to optimum offsets associated with correlations $R_{ij,pq,k}(h)$ greater than a predetermined threshold comprised between 0 and 1, means to construct a two-dimensional extraction matrix adapted to be filled with extracted values, means to select a seed point $P(i,j,t)$ and to determine the point $P(i,j,k)$ which is vertically nearest, and means to estimate the related properties of the conditional neighborhood and to fill the two-dimensional extraction matrix with offset properties by translation of the current variable (t) of the value of the optimum offset corresponding to the point $P(i,j,k)$ which is vertically nearest.

According to other characteristics of the invention:

the device comprises means for memorizing and means for visualizing seismic parameters determined with the help of the process according to the invention.

The invention finally has for its object a computer software, comprising elements of program code to carry out the steps of a process according to the invention, when said program is executed by a computer.

BRIEF DESCRIPTION OF THE DRAWINGS

The invention will be better understood from the description which follows, given by way of non-limiting example, with reference to the accompanying drawings, in which.

DETAILED DESCRIPTION OF THE PREFERRED EMBODIMENT

With reference to FIGS. 1 to 5, identical or functionally equivalent elements are designated or marked in an identical manner.

Figure 1:
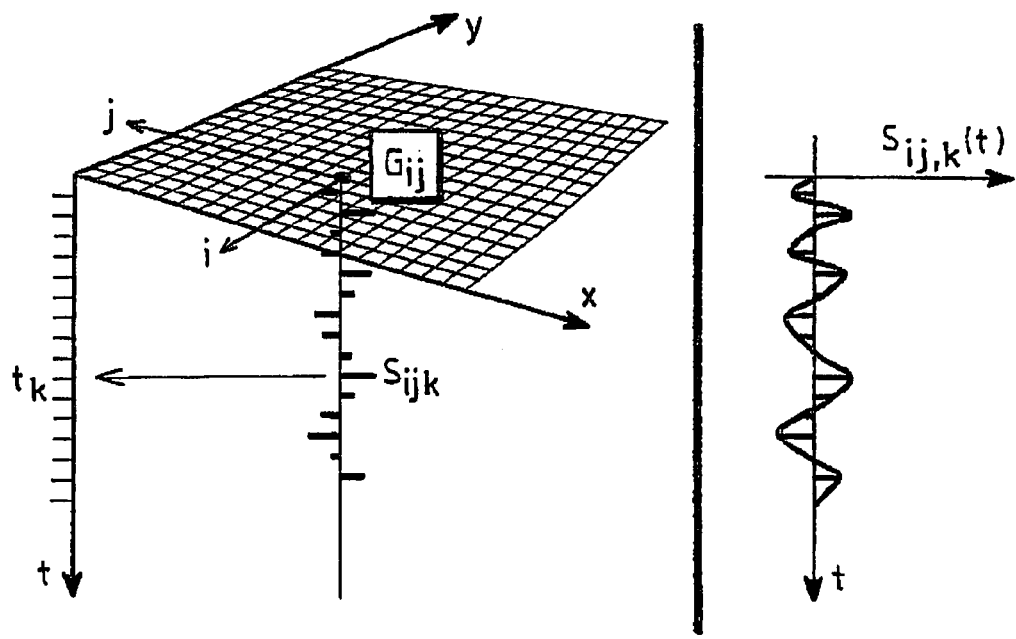
FIG. 1 is a schematic representation of a three-dimensional seismic matrix and a continuous local seismic trace.

In FIG. 1, a three-dimensional seismic matrix is obtained by picking up the measurements registered by the geophones $G_{ij}$ disposed on a network x,y at coordinate points i, j. The pickup of these samples measurements time-wise is represented along a descending axis t representative of the depth of a vertical descending from the surface of the ground or of the sea. The measurements are characterized by their amplitude, for example an amplitude picked up by the geophone $G_{ij}$ with time or at the sampling depth $t_k$. The discrete measurement carried out by the geophone $G_{ij}$ in time or at depth $t_k$ is called the seismic amplitude $S_{ij,k}$.

The assembly of seismic amplitudes corresponding to a geophone $G_{ij}$ of coordinates i, j is a one-dimensional matrix $(S_{ij}1, S_{ij}2, \ldots, S_{ijk}, \ldots, S_{ijN})$ called a discrete seismic trace, because this one-dimensional matrix corresponds to the trace according to the point of horizontal coordinates i, j of the three-dimensional seismic matrix obtained by seismic measurements.

The vertical axis t oriented along a descending vertical designates usually the time, but can also be considered to represent a depth from the surface.

The invention relates not only to the application of a third coordinate t representative of time, but also to a third coordinate t representative of depth.

From the discrete seismic trace located on the vertical of a geophone $G_{ij}$, there is defined, by interpolation or approximation, discrete values about $t-t_k=k$, a continuous function $S_{ij,k}(t)$ which is designated as the "continuous local seismic trace". The approximation or interpolation methods for discrete values to give rise to a continuous function are numerous, and comprise particularly polynomial interpolations or approximations, as well as polynomial trigonometric interpolations or approximations.

Any other interpolation or approximation variant giving a continuous function can also be applied to the present invention to provide a "continuous local seismic trace".

Figure 2:
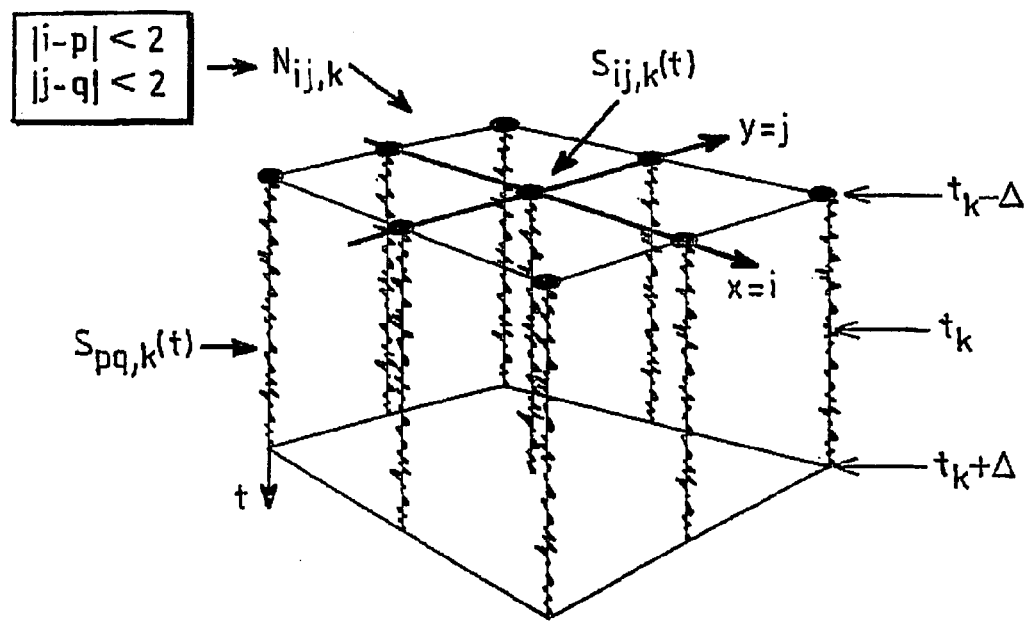
FIG. 2 is a schematic representation of an example of local neighborhood $N_{ij,k}$ consisting of an assembly of continuous local seismic traces $S_{pq,k}(t)$ adjacent the central reference trace $S_{ij,k}(t)$ itself located on the vertical of the geophone $G_{ij}$ and interpolating the seismic amplitudes about $t=k$.

In FIG. 2, several continuous local seismic traces define a neighborhood of a central reference continuous local seismic trace $S_{ij,k}(t)$. The neighborhood of a continuous local seismic trace $S_{ij,k}(t)$ is defined as the assembly of the continuous local seismic traces whose horizontal spatial indices p, q are adjacent horizontal spatial indices i, j of the reference continuous local seismic trace.

By way of example, the horizontal spatial coordinates p, q corresponding to geophone $G_{pq}$ are adjacent the horizontal spatial coordinates i, j corresponding to the geophone $G_{ij}$ if the absolute values of the differences i–p and j–q are less than given whole numbers, for example 2.

In this case, as shown in FIG. 2, the continuous local seismic trace $S_{ij,k}(t)$ is associated with eight neighboring continuous local seismic traces surrounding the central continuous local trace $S_{ij,k}(t)$.

In the case of continuous local seismic traces produced by seismic measurements, the profile of the geological horizons introduces vertical offsets between the adjacent continuous local seismic traces. For determining the relationships between two adjacent local continuous seismic traces $S_{ij,k}(t)$ and $S_{pq,k}(t)$ centered on the same sampling vertical coordinate $t=t_k=k$ and corresponding to different spatial coordinates i, j and p, q, there is calculated the correlation function $R_{ij,pq,k}(h)$ of two continuous local seismic traces.

The correlation function of two adjacent continuous local seismic traces is obtained by the following equation $$R_{ij,pq,k}(h) = \frac{C_{ij,pq,k}(h)}{\sqrt{C_{ij,ij,k}(0) \cdot C_{pq,pq,k}(0)}}$$

in which the numerator corresponds to the covariance function of $S_{ij,k}(t)$ and $S_{pq,k}(t)$ obtained by the following expression $$C_{ij,pq,k}(h) = \int_{t_k-\Delta}^{t_k+\Delta} S_{ij,k}(t) \cdot S_{pq,k}(t+h) \cdot dt.$$

In this integral defining $C_{ij,pq,k}(h)$, the parameter $\Delta$ defines a "vertical investigation window" about $t=t_k=k$.

For example, if the continuous local seismic traces $S_{ij,k}(t)$ and $S_{pq,k}(t)$ are trigonometric polynomials of the following form interpolating the seismic data $$S_{ij,k}(t) = \sum_{s=1}^{m} a_s^{ij,k} \cdot \cos(s\omega t) + b_a^{ij,k} \cdot \sin(s\omega t)$$

$$S_{ij,k}(t) = \sum_{s=1}^{m} a_s^{ij,k} \cdot \cos(s\omega t) + b_a^{ij,k} \cdot \sin(s\omega t)$$

then one can show that the covariance function $C_{ij,pq,k}(h)$ is itself a trigonometric polynomial of the following form in which the coefficients $A_s^{ij,pq,k}$ and $B_s^{ij,pq,k}$ depend on the coefficients $a_s^{ij,k}$, $a_s^{pq,k}$, $b_s^{ij,k}$ and $b_s^{pq,k}$:

$$C_{ij,pq,k}(h) = \sum_{s\neq 1}^{m} A_s^{ij,pq,k} \cdot \cos(s\omega h) + B_s^{ij,pq,k} \cdot \sin(s\omega h)$$

A conventional and known mathematical result is that the correlation function $$R_{ij,pq,k}(h) = \frac{C_{ij,pq,k}(h)}{\sqrt{C_{ij,ij,k}(0) \cdot C_{pq,pq,k}(0)}}$$

translates a similarity of the correlative functions when this correlation function approaches 1.

The study of the correlation functions of the continuous local seismic traces $S_{ij,k}(t)$ and $S_{pq,k}(t)$ permit defining as optimum offset the value $h_{ij,pq,k}$ of h corresponding to the maximum of the correlation function $R_{ij,pq,k}(h)$, which is to say to the maximum of the correlation function nearest 1. Contrary to the prior art based on a discrete formulation of the correlation function $R_{ij,pq,k}(h)$, the use of a continuous formulation of the seismic traces and hence of the correlation function permits obtaining an optimum offset which is not necessarily a whole number multiple of the sampling interval along the vertical axis corresponding to the variable t.

Figure 3:
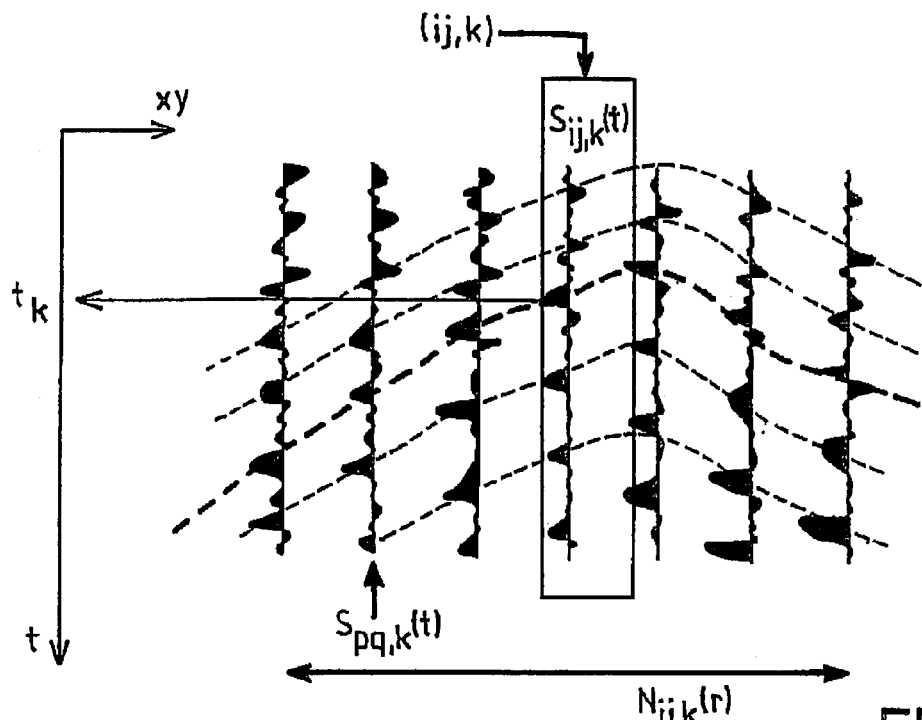
FIG. 3 shows schematically a vertical cross-section of conditional local neighborhood $N_{ij,k}(r)$ of a continuous reference local seismic trace $S_{ij,k}(t)$.
Figure 4:
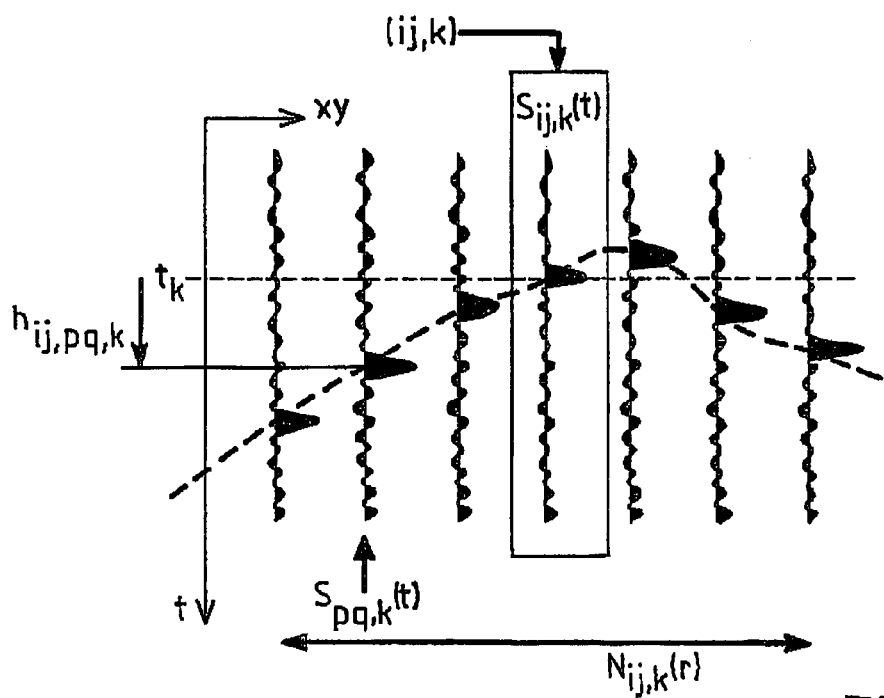
FIG. 4 shows schematically a vertical cross-section of a three-dimensional seismic matrix with optimum offset $h_{ij,pq,k}$ and a conditional neighborhood $N_{ij,k}(r)$.
Figure 5:
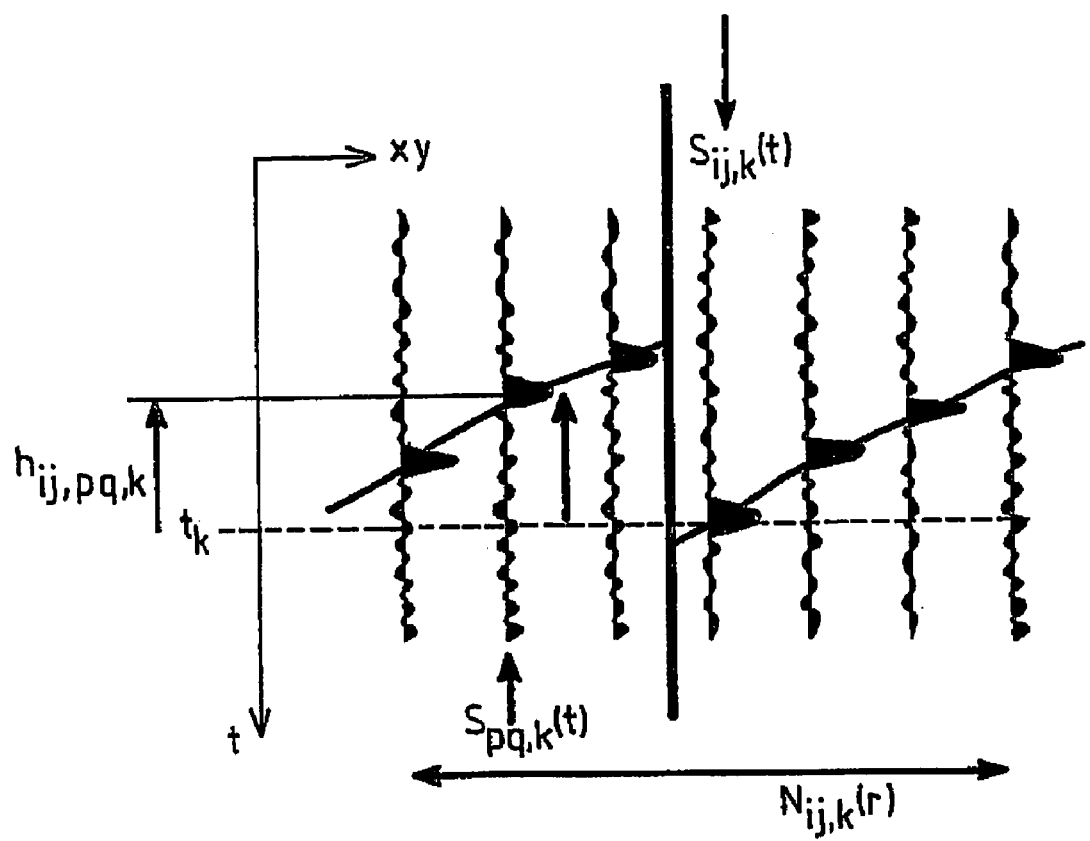
FIG. 5 shows schematically a vertical cross-section of a three-dimensional seismic matrix analogous to FIG. 4 with the presence of a fault or discontinuity.

The definition of the optimum offset $h_{ij,pq,k}$ of two adjacent continuous local seismic traces permits obtaining a first approximation of the horizons passing through this reference continuous local seismic trace $S_{ij,k}(t)$, as represented in FIGS. 3 to 5. Contrary to the prior art, the fact of using optimum offsets which are not necessarily a whole number multiple of the sampling interval along the vertical axis, permits avoiding errors known as "aliasing".

In FIGS. 3 to 5, there is defined a conditional neighborhood $N_{ij,k}(r)$ of the reference local continuous seismic trace $S_{ij,k}(t)$ which is a sub-neighborhood of the initial neighborhood of the continuous local seismic traces used for the computation of correlation and definition of the optimum offsets. The conditional neighborhood $N_{ij,k}(r)$ is selected such that, for any local continuous seismic trace $S_{pq,k}(t)$ belonging to $N_{ij,k}(r)$, the corresponding optimum offset $h_{ij,pq,k}$ is such that the correlation $R_{ij,pq,k}(h_{ij,pq,k})$ between $S_{ij,k}(t)$ and $S_{pq,k}(t)$ is greater than a predetermined threshold r comprised between 0 and 1.

As can be seen in FIG. 5, the fixing of the threshold r also permits encompassing in a conditional neighborhood a discontinuity or geological fault, which constitutes an important advantage relative to the prior art.

The above arrangements thus provide a continuous modeling permitting the practice of the invention.

Figure 6:
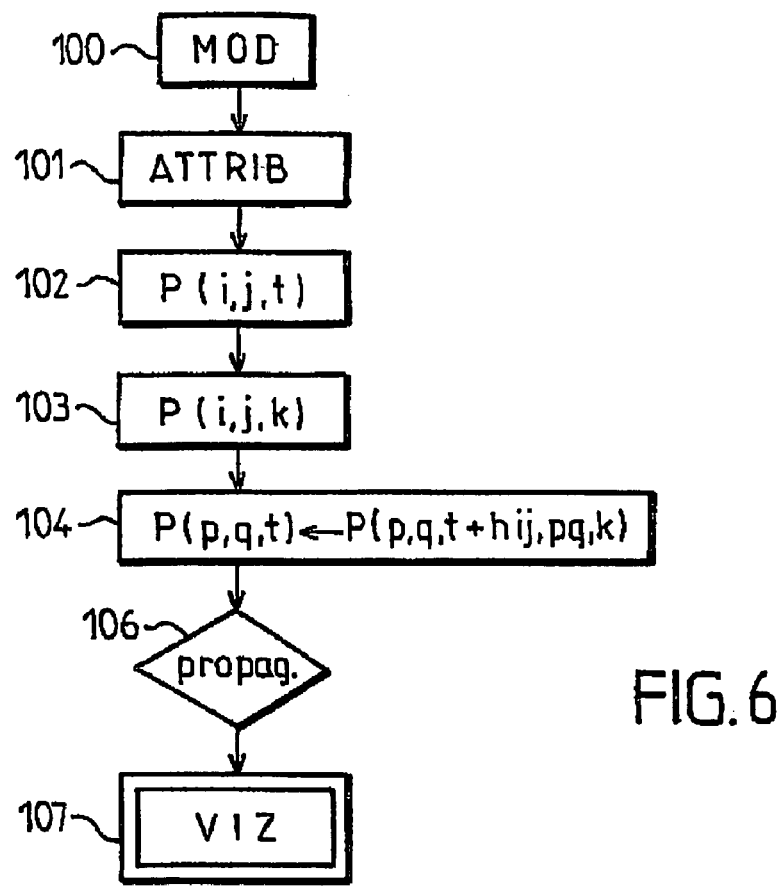
FIG. 6 shows schematically a functional organogram of a process according to the invention.

With reference to FIG. 6, a process according to the invention comprises a step of digital modeling 100 to define continuous local seismic traces, optimum offsets and conditional neighborhoods, as described with reference to FIGS. 1 to 5.

In step 101, there is defined a two-dimensional matrix whose indices of lines and columns correspond to the coordinates of the seismic measurement geophones.

In step 102, there is selected a seed point $P(i,j,t)$ or first extraction point.

In step 103, there is determined the node $(i,j,k)$ of the three-dimensional seismic matrix nearest the seed point $P(i,j,t)$.

This node has the spatial coordinates i,j and time or depth coordinates the coordinates $t_k=k$ nearest the coordinate t of the seed point $P(i,j,t)$ selected in step 102.

In step 104, there is selected first of all the local continuous local seismic traces $S_{pq,k}(t)$ belonging to the conditional neighborhood $N_{ij,k}(r)$ defined in step 100 and such that the indices (p,q) correspond to an empty location on the two-dimensional matrix defined in step 101.

Then, for each local continuous seismic trace $S_{pq,k}(t)$ thus selected, there is attributed to the point $P(p,q,t)$ the value $P(p,q,t+h_{ij,pq,k})$, in which $h_{ij,pq,k}$ is the optimum offset of the point $P(p,q,t+h_{ij,pq,k})$ relative to the adjacent point $P(i,j,k)$ determined in step 103. This point $P(p,q,t+h_{ij,pq,k})$ is considered as a new point located on the horizon and is stored at the location (p,q) on the two-dimensional matrix defined in step 101.

The process which has been described is adapted to determine the assembly of the points belonging to the horizon passing through a point $P(i,j,t)$, but it also applicable to attribute to these points, to the extent of their determination, an assembly of properties characterizing the physical nature of the terrains adjacent the horizon thus determined.

To this end, one can attach to each point $P(p,q,t+h_{ij,pq,k})$ of the two-dimensional matrix defined in step 101, an assembly of properties called "seismic attributes".

These properties are generally represented by different colors on screen displays, so as to permit a rapid visualization without risk of error of the properties associated with a geological horizon.

In practice, there are carried out steps similar to the steps described with reference to steps 100 to 104 and there are constructed the attributes of the point $P(p,q,t+h_{ij,pq,k})$ with the help of the equation of the local continuous seismic trace $S_{pq,k}(t)$; for example, there is thus constructed an envelope attribute, a phase attribute or a frequency attribute, in a manner known per se, for example according to information in the publication of TANER M. T., KOEHLER F., SHERIFF R. E., (1979), Complex seismic trace analysis, GEOPHYSICS, volume 44, No. 6, pages 1041 to 1063.

This method thus permits displaying the seismic attribute on the extracted horizon by painting it with corresponding colors.

The process which has been described thus permits defining the extraction values of a predetermined horizon corresponding to real data, but only in a conditional neighborhood of the point $P(i,j,k)$ nearest the selected seed point $P(i,j,t)$.

To propagate the process of extraction to the assembly of two-dimensional matrix defined in step 101, there is first of all constructed an assembly of new seed points constituted by new points $P(p,q,t+h_{ij,pq,k})$ located on the horizon which have been determined and are stored in corresponding locations (p,q) of the two-dimensional matrix defined in step 101. Each of these points is memorized in step 106, to be re-injected in step 102, and there serving as a new seed point.

This propagates the successive processing to the assembly of the two-dimensional matrix corresponding to the geophones.

When no new seed point can be found, the process is oriented in step 106 toward a step 107 of visualization on the screen of the horizons or attributes or properties associated with the geological horizon, to as to permit a visualization in color or in gray of the corresponding properties of the corresponding extracted geological horizon corresponding in real time t.

Thus, at the end of the algorithm defined in FIG. 6, the two-dimensional matrix of step 101, contains a plurality of points corresponding to the same horizon as the selected initial seed point $P(i,j,t)$.

Figure 7:
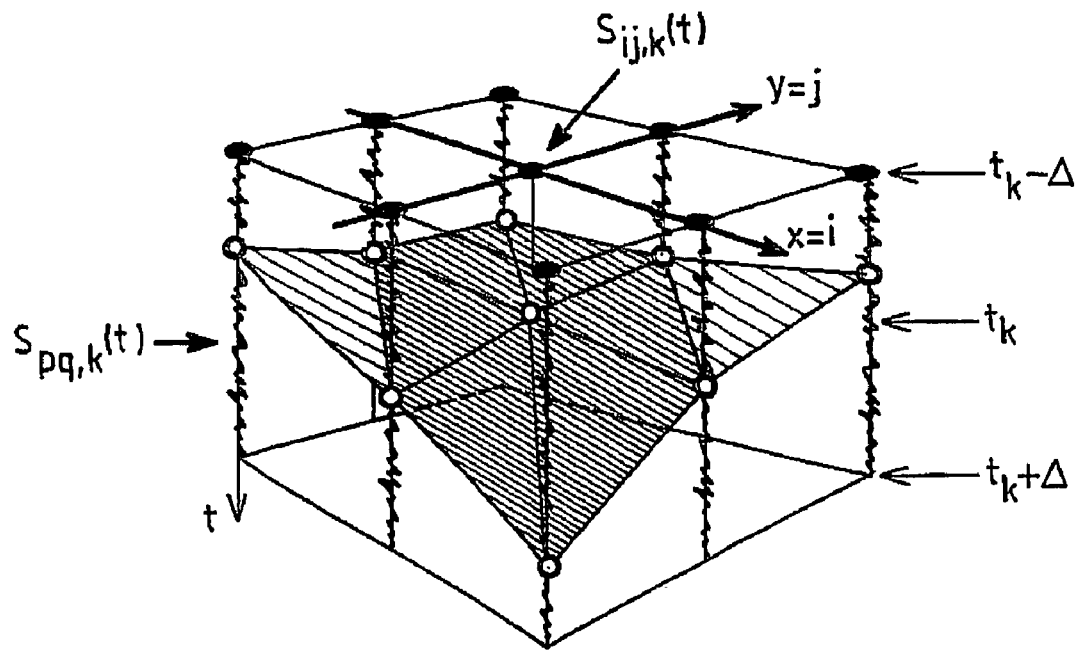
FIG. 7 shows schematically an enlarged partial view of a three-dimensional seismic matrix having a discontinuity and illustrating the practice of the process according to the invention.

The assembly of the points can be reordered with its neighbors, according to FIG. 7, to define a network entirely covering the horizon containing the seed point $P(i,j,t)$, this network thereby permitting representing the extracted horizon as a locally continuous surface on the visualization screen of a work station.

The process according to the invention is preferably practiced with a device comprising suitable means for practicing the steps described with reference to FIG. 6.

In particular, a device according to the invention comprises memory means needed for the successive computations and the visualization means necessary for step 107.

Preferably, a device according to the invention is a programmable device controlled by computer software comprising program code elements to execute the steps of the process described with reference to FIG. 6.

The invention described with reference to several particular objects is in no way thereby limited, but on the contrary covers all modification of form and any variation of embodiment within the spirit and scope of the invention.

The invention claimed is:

1. Process for extracting a geological horizon and related properties from a seismic representation, comprising:
   constructing a continuous function $S_{ij,k}(t)$ by interpolation or approximation of the discrete seismic functions of a multidimensional seismic matrix, said function being designated as a "continuous local seismic trace," comprising the following steps:
   a.) using as optimum (vertical) offset of two adjacent continuous local seismic traces, the value of offset rendering the maximum their correlation function, this optimum offset being not necessarily a whole number multiple of the vertical sampling interval;
   b.) taking as conditional neighborhood a central continuous local seismic trace $S_{ij,k}(t)$, the sub-neighborhood consisting in adjacent traces $S_{pq,k}(t)$ corresponding to optimum offsets $h_{ij,pq,k}$ associated with correlations $R_{ij,pq,k}(h_{ij,pg,k})$ greater than a predetermined threshold comprised between 0 and 1;
   c.) constructing a two-dimensional extraction matrix adapted to be filled with extracted points belonging to the same horizon as the one passing through the seed point;
   d.) selecting a seed point P(i,j,t) and determining the point P(i,j,k) of the three-dimensional seismic matrix that is vertically closest;
   e.) estimating the properties associated with the conditional neighborhood and filling the two-dimensional extraction matrix with properties offset by translation of the current variable (t) of the optimum offset value $(h_{ij,pq,k})$ corresponding to the vertically nearest point (i,j,k); and
   f.) making a record of the two-dimensional extraction matrix with properties corresponding to the vertically nearest point.

2. Process according to claim 1, in which there is used as the seed point of step d) all the new points stored in the two-dimensional matrix of step b) and not yet used as grain points.

3. Process according to claim 2, in which the content of the two-dimensional matrix of step c) is successively filled in the course of successive extraction repetitions.

4. Process according to claim 2, in which the content of the two-dimensional matrix of step c) is successively replaced by a mean of the successive contents in the course of successive extraction repetitions.

5. Process according to claim 2, in which the property of the extracted subsurface is an assembly of seismic attributes calculated at each extraction point on the horizon passing through the seed point, the computation of these attributes being itself carried out simultaneously with the extraction of these points.

6. Process according to claim 1, in which the content of the two-dimensional matrix of step c) is successively filled in the course of successive extraction repetitions.

7. Process according to claim 1, in which the content of the two-dimensional matrix of step c) is successively replaced by a mean of the successive contents in the course of successive extraction repetitions.

8. Process according to claim 1, in which the property of the extracted subsurface is an assembly of seismic attributes calculated at each extraction point on the horizon passing through the seed point, the computation of these attributes being itself carried out simultaneously with the extraction of these points.

9. Process according to claim 8, in which there is displayed along a visualization screen the seismic attributes painted on the extracted horizon.

10. Process according to claim 1, in which there is visualized along a visualization screen the seismic attributes painted on the extracted horizon.

11. Computer software, comprising program code elements to execute the steps of the process according to claim 10, when said program is executed by a computer.

12. Device for practicing the process according to claim 1, comprising means to use as optimum offset of two adjacent continuous local seismic traces, the value of offset rendering maximum their correlation function, means to take as conditional neighborhood of a reference central continuous local seismic trace $S_{ij,k}(t)$ the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1, means to construct a two-dimensional extraction matrix adapted to be filled with extracted values, means to select a seed point P(i,j,t) and to determine the point P(i,j,k) that is vertically closest, and means to estimate the related properties of the conditional neighborhood and to fill the two-dimensional extraction matrix with properties offset by translation of the current variable (t) of the value of the optimum offset $(h_{ij,pq,k})$ corresponding to the vertically nearest point (i,j,k).

13. Device according to claim 12, comprising memorization means and visualization means for the seismic parameters.

14. Computer program, comprising elements for program code to execute the steps of the process according to claim 1, when said program is executed with a computer.

15. Process for extracting a geological horizon and related properties from a seismic representation, comprising the steps of:
   obtaining a three-dimensional seismic matrix by picking up measurements registered at the coordinate points i, j;
   recording a time-wise representation of the pickup of the measurements time-wise a descending axis t representative of a depth of a vertical descending from a ground surface or a sea surface, each of the measurements characterized by a picked-up amplitude at a corresponding sampling time or depth tk, wherein each discrete measurement carried out by the geophone Gij at the corresponding time or depth tk is called the seismic amplitude Sij,k,
   the recording saving the assembly of seismic amplitudes corresponding to each geophone Gij of each coordinate i,j as a one-dimensional matrix (Sij1, Sij2, . . . , Sijk, . . . , SijN) called a discrete seismic trace corresponding to a trace according to the point of the horizontal coordinates i,j;
   constructing a continuous function $S_{ij,k}(t)$ by interpolation or approximation of the discrete seismic functions of a multidimensional seismic matrix, said function being designated as a "continuous local seismic trace," comprising the following steps:
   a.) using as optimum (vertical) offset of two adjacent continuous local seismic traces, the value of offset rendering the maximum their correlation function, this optimum offset being not necessarily a whole number multiple of the vertical sampling interval;

b.) taking as conditional neighborhood a central continuous local seismic trace $S_{ij,k}(t)$, the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1;

c.) constructing a two-dimensional extraction matrix adapted to be filled with extracted points belonging to the same horizon as the one passing through the seed point;

d.) selecting a seed point $P(i,j,t)$ and determining the point $P(i,j,k)$ of the three-dimensional seismic matrix that is vertically closest;

e.) estimating the properties associated with the conditional neighborhood and filling the two-dimensional extraction matrix with properties offset by translation of the current variable (t) of the optimum offset value $(h_{ij,pq,k})$ corresponding to the vertically nearest point $(i,j,k)$; and f.) making a record of the two-dimensional extraction matrix with properties corresponding to the vertically nearest point.

16. The process of claim 15, comprising the further step of displaying a seismic attribute on an extracted horizon by painting with corresponding colors.

17. The computer readable storage medium of claim 15, further comprising recorded instruction to cause the computer to display a seismic attribute on an extracted horizon by painting with corresponding colors.

18. A computer readable storage medium tangibly embodying a program of instructions executable by a computer to control the computer to function for extracting a geological horizon and related properties from a seismic representation, the program causing the computer to:

construct a continuous function $S_{ij,k}(t)$ by interpolation or approximation of the discrete seismic functions of a multidimensional seismic matrix, said function being designated as a "continuous local seismic trace," comprising the following steps:

a.) using as optimum (vertical) offset of two adjacent continuous local seismic traces, the value of offset rendering the maximum their correlation function, this optimum offset being not necessarily a whole number multiple of the vertical sampling interval;

b.) taking as conditional neighborhood a central continuous local seismic trace $S_{ij,k}(t)$, the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1;

c.) constructing a two-dimensional extraction matrix adapted to be filled with extracted points belonging to the same horizon as the one passing through the seed point;

d.) selecting a seed point $P(i,j,t)$ and determining the point $P(i,j,k)$ of the three-dimensional seismic matrix that is vertically closest;

e.) estimating the properties associated with the conditional neighborhood and filling the two-dimensional extraction matrix with properties offset by translation of the current variable (t) of the optimum offset value $(h_{ij,pq,k})$ corresponding to the vertically nearest point $(i,j,k)$; and f.) record of the two-dimensional extraction matrix with properties corresponding to the vertically nearest point.

* * * * *